Patented Jan. 16, 1951

2,537,970

UNITED STATES PATENT OFFICE 2,537,970

PREPARATION OF SYNTHETIC RESIN SHEETS

Reuben T. Fields, Arlington, N. J., assignor to E. I. du Pont de Nemours & Company, Wilmington, Del., a corporation of Delaware No Drawing. Application May 20, 1949, Serial No. 94,509

11 Claims. (Cl. 18—58)

This invention relates to the preparation of synthetic resin sheets and, more particularly, to a process of casting methyl methacrylate sheets.

The preparation of cast sheets from methyl methacrylate or similar polymerizable liquids has been carried out heretofore by the process and type of apparatus disclosed in Rohm et al. U. S. Patent 2,154,639. To prepare methyl methacrylate sheets having high clarity and exceptional optical properties so widely used today, the cell in which the sheets are cast, have been made of two glass plates separated by a compressible gasket to accommodate for the shrinkage in the conversion of the polymerizable liquid to solid polymer.

While excellent polymer sheets may be produced with care in this manner, the apparatus involved is costly, the process is not an economical one to operate and involves a considerable amount of skilled labor. Further, it in no way lends itself to continuous operation.

An object of the present invention is to provide a new, improved, and more economical process of preparing synthetic resin sheets. A further object is to provide a practical process of preparing flat sheets from liquid methyl methacrylate and similar liquid polymerizable compounds which process eliminates the use of the cells characteristic of the prior art procedure and which is readily adapted for continuous operation. Other objects will be apparent from the description of the invention given hereinafter.

The above objects are accomplished according to the present invention by distributing a liquid polymerizable compound on the surface of a body of an aqueous salt solution and thereafter polymerizing the compound at a temperature between 0° C. and 80° C., the aqueous salt solution being maintained at a temperature between —20° C. and 80° C. and being substantially saturated at said temperature and having a specific gravity at least as great as the polymer being formed.

While from the point of view of operativeness, the present invention is broadly applicable to liquid polymerizable compounds in general, its utility is manifestly restricted to such polymerizable compounds that give polymers suitable for use in sheet form and, particularly, relatively rigid cast sheets. The polymers best adapted for such sheets are methyl methacrylate polymer and polystyrene or, as substantial equivalents, copolymers of either with lesser proportions of other polymerizable compounds, usually ethylenically unsaturated compounds, and, hence, the invention will be more particularly described with respect to methyl methacrylate and styrene.

In preferred form, the invention is carried out by polymerizing the liquid polymerizable compound through subjecting it to actinic light at a temperature between 15° C. and 50° C. Further, it is preferred to use a syrup of the polymerizable compound having a viscosity between .5 and 25 poises and, for the preparation of transparent sheets of highest optical properties, a solution of lithium or magnesium chloride is not only preferred but, surprisingly, appears to be unique for the purpose.

The following examples in which all parts are given by weight unless otherwise stated, illustrate specific embodiments of the invention.

Example I

Lithium chloride was dissolved in a quantity of distilled water by heating to approximately 70° C. with agitation. The resulting salt solution was saturated at approximately 50° C., and had a specific gravity of about 1.3 at 50° C. In a similar manner an aqueous solution of hydrated magnesium chloride ($MgCl_2.6H_2O$) was prepared, this solution also being saturated at about 50° C. and having a specific gravity of about 1.3. Each of the salt solutions was poured into a gallon bottle so that the bottle was approximately one-third full. Thereafter, methyl methacrylate monomer containing 0.1% benzoyl peroxide, was distributed onto the surface of each of the salt solutions in a quantity sufficient to give a casting approximately ⅛ inch in thickness.

The bottles were tightly stoppered and placed in a circulating air oven maintained at about 70° C. Polymerization of the ⅛ inch sheet castings was substantially completed after about 3 hours. Both of the castings were clear and free of bubbles.

Following the above procedure but substituting salt solutions of sodium chloride, magnesium sulfate, calcium chloride, or zinc sulfate saturated at 50° C., instead of the magnesium chloride or lithium chloride, similar cast sheets may be prepared except that the surface of the sheets adjacent the salt solution will, in each instance, be hazy. Such sheets are equal to those prepared with the magnesium and lithium chloride solutions except for their optical properties.

Example II

The procedure outlined in Example I was repeated except that hydrated magnesium chloride aqueous solution saturated at 61° C. was used as the liquid on which the methyl methacrylate monomer was distributed. As in Example I, the monomer was distributed on the surface of the salt solution in order to make a cast sheet approximately ⅛ inch in thickness and the polymerization was carried out in a circulating air oven at 70° C. for three hours. The resulting cast sheet was perfectly clear and free of bubbles.

For purposes of comparison, the procedure of this example was repeated except that the magnesium chloride solution used was saturated at 22° C. instead of 61° C. The sheet resulting in this instance had a smooth hazy lower surface indicating that excessive water from the aqueous salt solution had diffused into the monomer. This illustrates that the aqueous salt solution used as the liquid on which the monomer is cast, should be substantially saturated at the temperature at which the solution is maintained. Obviously, this temperature will be substantially identical with the polymerization temperature, i. e., 70° C. in this instance, in a batch process such as here illustrated. The temperature of the solution may be appreciably below the temperature of the compound undergoing polymerization as is illustrated in Example III.

*Example III*

The following example illustrates a continuous process for polymerizing methyl methacrylate sheeting on the surface of an aqueous salt solution.

An aqueous solution of magnesium chloride was prepared so as to produce an aqueous salt solution which was saturated at 10° C. and had a specific gravity of about 1.3 at 10° C. This solution of magnesium chloride was then poured into a Monel metal tray 18″ wide by 6′ long by 1½″ in depth until the solution rose to a depth of ¾ of an inch.

A syrup of methyl methacrylate having a viscosity of about 15 poises containing 0.1% by weight of benzoin, was distributed onto the surface of the magnesium chloride solution through a small tube at the rate of about 0.1 gallon per hour. Two parallel belts fabricated from polytetrafluoroethylene, 0.035″ in thickness by 1½″ in width, spaced 18″ apart, were moved concurrently with the syrup as a means of confining the syrup so that a sheet 18″ in width would be formed. The belts, which were immersed into the salt solution to a depth of about ½″ were moving at a speed of about 1 foot per hour. The adjacent salt solution was circulated concurrently with the syrup at approximately the same rate as the syrup, and was cooled and filtered in a continuous fashion. Under the foregoing conditions a polymeric sheet having a caliper of about ⅛″ was formed.

The Monel metal tray was covered with a sheet of glass which permitted the maintenance of an atmosphere of nitrogen above the surface of the polymerizing mass. The salt solution was maintained at a temperature of 15° C. by a cooling jacket beneath the Monel tray. The inlet temperature of the syrup was about 15° C., and during polymerization the temperature rose to a maximum of about 40° C. As the source of polymerization energy a bank of 20 BL-360 lights (BL-360 fluorescent lights manufactured by the General Electric Co. produce "black light" of maximum intensity at approximately 3600 Angstroms wave length) was suspended above the casting tray. Upon emerging from the irradiated zone, the polymethyl methacrylate sheeting was substantially completely polymerized. The sheeting produced was of particularly high clarity with smooth surfaces and free of bubbles.

In this example a lithium chloride solution saturated at 10° C. may be substituted for the magnesium chloride solution to obtain the same clear, transparent sheeting. Also, the procedure may be run without change using mixtures of methyl methacrylate monomer or syrup with other monomers. To illustrate, 87 parts of a syrup of methyl methacrylate mixed with 13 parts of ethyl acrylate monomer to give a mixture having a viscosity of 15 poises or 88 parts of a syrup of methyl methacrylate mixed with 12 parts of isobutyl methacrylate monomer to give a mixture having a viscosity of 15 poises, may be used in place of the straight methyl methacrylate syrup and equally good sheeting will be obtained.

The above examples are merely illustrative and the invention broadly comprises distributing a liquid polymerizable compound on the surface of a body of an aqueous salt solution and thereafter polymerizing the compound at a temperature between 0° C. and 80° C., the aqueous salt solution being maintained at a temperature between −20° C. and 80° C. and being substantially saturated at that temperature and having a specific gravity at least as great as the polymer being formed. As shown in the examples, the process is equally adapted for both batch or continuous operation.

The invention, as previously mentioned, is particularly useful as applied to the production of methyl methacrylate or styrene sheets but may be used for the production of sheets from any liquid polymerizable compound. Mixtures of methyl methacrylate or styrene with other polymerizable compounds in lesser proportions may be substituted for the methyl methacrylate or styrene monomers or syrup. Other polymerizable liquids such as methyl, ethyl, propyl and butyl acrylates and ethacrylates, ethyl, propyl and butyl methacrylates, vinyl chloride, vinylidene chloride, methyl styrene and the like are examples of other ethylenically unsaturated compounds to which the process is fully applicable although sheets of such polymerized compounds are not in great demand.

An important factor in this invention is the aqueous salt solution on which the polymerizable liquid is distributed. The salts are restricted to salts of inorganic acids; solutions of some salts of organic acids such as sodium acetate will enable a sheet to be formed but the quality of the sheet is inferior and no reason is known for preferring such organic salts over inorganic salts. On the other hand, the widest assortment of water-soluble, inorganic salts may be used successfully, including: sodium chloride, bromide, iodide, and sulfate, potassium chloride, bromide, and sulfate, magnesium sulfate, calcium chloride, barium chloride, zinc sulfate, and ammonium sulfate, as well as the two preferred salts, i. e., lithium chloride and magnesium chloride.

The salt solution must qualify in two respects to be useful in this invention, namely, it must have a specific gravity at least as great as the polymer being formed as otherwise the sheet would not remain on the surface of the salt solution and the liquid polymerizable compound and the salt solution must be substantially mutually insoluble. The specific gravity of the salt solution actually can be slightly below that of the polymer in a continuous operation if mechanism for withdrawing the formed sheet is provided in a manner that tends to keep the sheet on the surface but it is more practical to employ a solution having a specific gravity at least equal to that of the polymer even in such instances. Absolute mutual insolubility of the salt solution and the polymerizable liquid would be ideal but in practice is hardly attainable and substantial mutual insolubility is all that is required.

It has been discovered that a salt solution will fulfill this requirement of mutual insolubility with the methyl methacrylate or styrene liquid if it has a specific gravity at least equal to that of the methyl methacrylate or styrene polymer and is substantially saturated at the temperature at which it is in contact with the methyl methacrylate or styrene. The minimum specific gravity limitation excludes solutions of salts that are soluble in water only to an insignificant degree since even saturated solutions of such salts will not, of course, have a specific gravity as great as the polymer being formed. Saturated solutions of the other salts have the quality of being substantially mutually insoluble with the liquid methyl methacrylate or styrene.

It is neither necessary nor feasible to maintain the salt solution at absolutely 100% saturation at the maximum temperature at which it is in contact with the polymerizable liquid, i. e., the operating temperature of the salt solution, but it should be substantially saturated. While theoretically the mutual insolubility of the salt solution and polymerizable liquid is greatest when the solution is 100% saturated, in practical effect there is no appreciable difference when using a 100% saturated solution at the operating temperature or a solution saturated at a temperature up to 20° C. or so below the operating temperature. On the other hand, if a solution 100% saturated at the operating temperature is used and the temperature of the solution should happen to drop slightly during the operation, the salt would precipitate out and there would be danger that the precipitated salt would come in contact with the polymerizing film. This hazard is greater in the continuous operation where the salt solution is flowing.

In view of the above considerations, it is preferred to form a salt solution which is saturated at a temperature below that at which there is any probability the salt solution will fall during the process. This is illustrated in the examples but Example II also illustrates the difficulties encountered when the magnesium chloride solution saturated at about 40° C. below the operating temperature, is used. The increased solubility of salts in water with each degree of temperature rise varies from salt to salt but, in general, if the salt solution is saturated at no more than 20° C. below the operating temperature, the solution will be substantially saturated at the operating temperature and operative for use in this invention. In the case of salts whose solubility in water varies but slightly with temperature changes, a solution saturated at temperatures even more than 20° C. below the operating temperature will be substantially saturated at the operating temperature and, hence, useful.

The operating temperature of the salt solution as already indicated is not necessarily the same as the temperature of the polymerizing layer distributed on it. If polymerization is to be effected by thermal energy, the heat will usually be supplied in whole or part by the salt solution and the temperature of the polymerizing layer and salt solution will be substantially the same. But thermal polymerization can be effected by application of heat from above, e. g., by use of a bank of infrared lights, in which instance the salt solution may be at a temperature well below that of the polymerizing layer. Special cooling means may be provided for maintaining the salt solution at a low temperature for the purpose of holding down the temperature of the polymerizing layer which, nevertheless, may arise well above that of the salt solution.

In effecting polymerization by actinic energy, it will be more usual to maintain the salt solution at a relatively low temperature. In general, the lower the temperature of the polymerizing layer is kept, the better is the resulting polymer sheet. As against this, the polymerization must proceed at an appreciable rate to be economically feasible. With the use of a photopolymerization catalyst and proper radiation of the layer of polymerizable liquid, polymerization may be effected at quite rapid rates with the salt solution maintained at extremely low temperatures. Temperatures below −20° C. are, however, not practical due to the cost of refrigeration.

It will be apparent that the temperature of the salt solution cannot appreciably exceed that of the polymerizing layer. Hence, the operating temperature of the salt solution may range from 80° C., the highest temperature to which it is practical to allow the polymerizing layer to rise, down to −20° C.

Aqueous inorganic salt solutions in general may be used in this invention providing they meet the two requirements as to specific gravity and mutual insolubility with the polymerizable liquid. On such solutions, with two known exceptions, polymer sheets of excellent properties may be formed although the underside of the sheets will be hazy. The degree of haze will vary somewhat on the salt used but as long as there is any appreciable haze such sheets are not satisfactory where clarity and transparency are required. However, such sheets are not impaired in their physical properties other than the one of optical clarity.

The two exceptions noted above are aqueous solutions of lithium chloride and magnesium chloride. It has been discovered that when solutions of these salts are used, the haziness in the polymer sheet is eliminated and sheets of finest optical properties are obtained. The reason for this is not known as salts closely related to both of these salts and salts more closely related to one than these two salts are to each other fail to eliminate this haziness. It remains simply a discovery made by actual experimentation without logical explanation for the phenomena. Presumably, solutions of these two salts are of more perfect mutual insolubility with the polymerizable liquid than are solutions of other salts but why this should be is unexplained. The preferred embodiment of the invention and, indeed, the apparently necessary embodiment if sheets of highest optical properties are to be obtained, is that in which an aqueous solution of lithium chloride or magnesium chloride is employed.

It will be apparent to those skilled in the art that the salt selected for the aqueous solution should be one stable at the operating temperature. A salt that decomposed in water solution at the operating temperature might not necessarily be inoperative but obviously would introduce needless complications such as the release of gases which could cause mechanical difficulties or might even attack the polymerizing film chemically. The aqueous solution on which the polymerizable liquid is distributed need not be motionless since it can flow smoothly as shown in Example III but naturally one cannot expect to obtain a flawless, flat sheet if the surface of the aqueous solution is going to be disturbed either by vigorous generation of gas in the solution or any other type of agitation.

Polymerization in the process of this invention may be effected by either thermal energy or actinic energy. Photopolymerization is preferred since it lends itself so well to continuous operation and, in addition, gives improved control of the polymerization rate with resulting average molecular weight control of the polymer and polymerization at lower temperatures. The present invention does not reside in specific features of the polymerization conditions such as temperature, polymerization catalyst, and the like which are well known in the prior art. It is preferred to carry out the polymerization between 15° C. and 50° C. with the salt solution maintained between 0° C. and 30° C. in a continuous operation using actinic energy. Further, to eliminate oxygen inhibition it is preferred that the atmosphere above the upper surface of the polymerizing layer be blanketed with an inert gas such as nitrogen or carbon dioxide, a known prior art expedient.

A polymerization catalyst will usually be mixed with the polymerizable liquid. Such catalysts and the proportions in which they are desirably used, are thoroughly discussed in the prior art. Photopolymerization catalysts are discussed in copending application Serial No. 655,013, filed March 16, 1946 in the name of L. R. Salisbury and in U. S. Patents 2,367,660; 2,367,661; and 2,448,828 including the proportions in which they are conventionally used. Preferred photopolymerization catalysts include benzoin, benzoin methyl ether, benzoin ethyl ether, and various azo catalysts such as alpha,alpha' azodiisobutyronitrile but any photopolymerization catalyst may be used in this invention.

The well known thermal polymerization catalysts include benzoyl peroxide, lauroyl peroxide, acetyl benzoyl peroxide, diacetyl peroxide, tertiary butyl perbenzoate, and such azo catalysts as alpha,alpha' azodiisobutyronitrile and alpha,-alpha' azobis (alpha,gamma-dimethylvaleronitrile) and other azo compounds disclosed in copending application Serial No. 2,551, filed January 15, 1948, in the name of Madison Hunt, now U. S. Patent No. 2,471,959.

The present invention contemplates adding to the liquid polymerizable compound various modifiers such as dyestuffs, pigments, plasticizers, lubricants, pearlescent materials and the like to obtain desired characteristics in the finished sheet, according to well-known practices in the art. When photopolymerization is to be used, it is apparent that any additives or modifiers which would make the polymerizable liquid opaque to light would not be satisfactory although dark color castings can be readily produced by thermal polymerization.

The viscosity of the polymerizable liquid may vary between that of the monomer, in the neighborhood of 0.4 centipoise for methyl methacrylate to the viscosity of heavy syrups of about 40 poises. In general, particularly for continuous operation, the viscosity preferably should be between .5 and 25 poises, it being somewhat difficult to handle properly a highly viscous syrup while the use of a syrup, if not too viscous, instead of the monomer is advantageous since it reduces the time necessary to complete polymerization and, also, the amount of exothermic heat is less. Syrups of the polymerizable compound may be prepared either by dissolving polymer in monomer until the desired viscosity is reached or by polymerizing the monomer until the desired viscosity is reached, prior to distributing on the body of aqueous salt solutions.

An advantage of the present invention which is readily apparent, is that it is adapted for continuous operation with the resulting obvious economies and advantages. Further, whether the process is carried out batchwise or continuously, it is advantageous in that the preparation of sheets of uniform caliper is practically unavoidable whereas in the cell type mold heretofore mentioned it presented a constant problem. Also, local overheating in the polymerizing layer is readily avoided as the heat is transferred directly to the aqueous salt solution and this leads to the preparation of optimum quality sheeting. Heretofore, the exothermic heat of polymerization had to be dissipated through the glass walls of the cell and the poor conductivity of the glass presented a problem. Still further, there is no problem of adherence to the walls of a mold with the resulting strains set up in the sheets such as was encountered heretofore. Moreover, sheets produced in accordance with this process have a superior surface.

Not only does the present invention have the advantages above but, even run batchwise, it will be evident that the apparatus needed is less costly than that used heretofore and that the manipulative skill required of the operator is far less than required in preparing sheets heretofore.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing clear, transparent synthetic resin sheets which comprises distributing a liquid polymerizable compound from the group consisting of methyl methacrylate and styrene, said liquid polymerizable compound having a viscosity no greater than 40 poises, on the surface of an aqueous salt solution of a metal chloride from the group consisting of lithium and magnesium chlorides, and thereafter polymerizing said compound at a temperature between 0° C. and 80° C., said aqueous salt solution being maintained at a temperature between —20° C. and 80° C. and being substantially saturated at said temperature.

2. Process as set forth in claim 1 wherein said liquid polymerizable compound is polymerized by subjecting same to actinic light.

3. Process as set forth in claim 1 wherein said liquid polymerizable compound is methyl methacrylate.

4. Process as set forth in claim 1 wherein said aqueous salt solution is an aqueous solution of magnesium chloride.

5. Process as set forth in claim 1 wherein said aqueous salt solution is an aqueous solution of lithium chloride.

6. Process as set forth in claim 2 wherein said liquid polymerizable compound is methyl methacrylate.

7. Process as set forth in claim 6 wherein said aqueous salt solution is an aqueous solution of magnesium chloride.

8. Process as set forth in claim 6 wherein said aqueous salt solution is an aqueous solution of lithium chloride.

9. Process of preparing clear, transparent synthetic resin sheets which comprises distributing liquid methyl methacrylate having a viscosity no greater than 40 poises on the surface of a body of an aqueous salt solution of a metal chloride from the group consisting of lithium and magnesium chlorides, and thereafter subjecting said methyl methacrylate to actinic light at a temperature between 15° C. and 50° C. until polymerization is complete, said aqueous salt solution being maintained at a temperature between 0° C. and 30° C. and being substantially saturated at said temperature.

10. Process as set forth in claim 9 wherein said aqueous salt solution is an aqueous solution of magnesium chloride.

11. Process as set forth in claim 9 wherein said aqueous salt solution is an aqueous solution of lithium chloride.

REUBEN T. FIELDS.

REFERENCES CITED

The following references are of record in the file of this patent:

UNITED STATES PATENTS

| Number | Name | Date |
|---|---|---|
| 2,369,057 | Leary et al. | Feb. 6, 1945 |
| 2,370,562 | Meunier | Feb. 27, 1945 |